BINARY DIGITAL-TO-ANALOG CONVERTER FOR SYNCHRO DEVICES

Filed May 25, 1956

2 Sheets-Sheet 1

INVENTOR
S. B. PFEIFFER
BY [signature]
ATTORNEY

Dec. 17, 1957 S. B. PFEIFFER 2,817,078

BINARY DIGITAL-TO-ANALOG CONVERTER FOR SYNCHRO DEVICES

Filed May 25, 1956 2 Sheets-Sheet 2

FIRST MAGNITUDE GENERATOR

INVENTOR
S. B. PFEIFFER
BY [signature]
ATTORNEY

United States Patent Office 2,817,078

Patented Dec. 17, 1957

2,817,078

BINARY DIGITAL-TO-ANALOG CONVERTER FOR SYNCHRO DEVICES

Sigmund B. Pfeiffer, New Providence, N. J., assignor to Bell Telephone Laboratories, Incorporated, New York, N. Y., a corporation of New York Application May 25, 1956, Serial No. 587,281

12 Claims. (Cl. 340—347)

This invention relates to digital-to-analog conversion and more particularly to converters arranged to accept normal binary code groups and directly synthesize corresponding analog outputs suitable for use, as an example, in operating synchro or resolver type devices.

The advantages and disadvantages of both analog and digital data systems are well known, and in many instances it is possible to realize the advantages of each system through digital-to-analog converters which transfer data between mediums. In general, a digital-to-analog converter is intended to develop from each applied code group of pulses a single quantity some characteristic of which is a measure of the analog quantity represented by that code. There are many possible analog mediums into which the digital data may be converted. For example, the output quantity corresponding to each code group may be employed as produced or those corresponding to several successive groups may be combined to produce a replica of a signal wave as in pulse code transmission.

A wide variety of converters has been devised, and these have been classified in the IRE Convention Reports, "Information Theory and Computers," March 1953, page 109, as counting, reading and weighting types. The reading type of decoder with which the present invention is primarily concerned is based upon a switching system which selects a different output circuit for every applied code combination such that the proper analog output is delivered for each code combination.

As one application of the reading type converter, it has been proposed to approximate the analog signals represented by successively transmitted code groups. The approximated analog signals, composed of straight line segments each representing a continuous range of amplitudes, are generated by selectively modulating a source of alternating current in accordance with the amplitude encoded at a transmitter. The approximated analog output, which is effectively an alternating current wave of the proper frequency modulated by the digital information, may be applied, for example, to the stator of a synchro causing the rotor to turn through the angle represented by the digital input. The approximated analog output reproduces the encoded analog signal to a degree of accuracy greater than can be reproduced as a shaft rotation by even the most precise synchro. The use of such a converter eliminates the necessity for encoding at the transmitter a large number of amplitudes each of which would have to be converted individually to reconstruct the transmitted analog as in the case of the more complicated types of digital-to-analog converters.

It is an object of the present invention to provide an improved reading type converter for approximating analog signals which is less complex and requires substantially less power than those converters previously suggested for use with normal or straight binary code.

Synthesis of suitable analog outputs for operating synchro resolvers directly from received binary codes is made practical by the fact that as the transmitter shaft is rotated its angular position may be represented by two sinusoids in quadrature. Thus, the conversion process may be simplified since the variations of amplitudes with shaft position must fall on predetermined curves. According to prior arrangements such sinusoids have been approximated as proposed by S. J. O'Neill in an article entitled "Network for digital-to-analogue shaft position transducers" appearing in AIEE Transactions, November 1954, at pages 454–456, but generally the unduly complicated switching circuit required rendered converters of this general type as complex as the more usual decoder-servo type converter if the number of straight line segments is increased sufficiently to attain reasonable accuracy of reproduction of the encoded analog signal.

In accordance with the present invention, a source of alternating current of the frequency required for the operation of a synchro resolver or like device is effectively modulated along two identical approximated-sinusoids in quadrature composed of straight line segments in accordance with the angular position represented by a particular code group. An appropriate magnitude is determined for each straight line segment and the midpoint of each straight line segment represents a particular portion of the maximum amplitude of the approximated sinusoid. For definition purposes, the midpoint voltage of each segment is defined as a "magnitude voltage." The magnitudes of each segment are obtained selectively from taps on a power transformer. The end points of each straight line segment are also a particular portion of the maximum amplitude of the approximated sinusoids and for definition purposes the difference between the voltage at each end point of a segment is defined as a "slope voltage." It can be established geometrically for the two approximate sinusoids in quadrature that certain magnitude voltages and slope voltages have a fixed relationship with respect to one another, and the combination of these selected magnitude and slope voltages on a step-by-step basis develops the approximated sinusoids in response to the succession of code groups which represent the rotation of the transmitter shaft. Here multisegment approximation is used and one part of each received group of code pulses arranges the power transformer taps to develop the appropriate magnitudes of proper polarity for each segment. The remaining digits of the code operate a series of switches located in the secondaries of transformers connected to the output of the power transformer. The secondaries develop the slope voltages and are properly interconnected to combine associated slope and magnitude voltages. The magnitude voltages are combined with predetermined portions of their associated slope voltages in response to the successive code variations the combined voltages producing a range of variation along a predetermined segment. The process of combining slope and magnitude voltages is referred to as evaluation. It is evident that at any instant the converter output voltages will be that represented by the code group received.

The simple relationship between magnitude and slope voltages enables both voltages to be developed in one circuit, and the linear nature of the code causes the combined slope and magnitude voltage to fall along a predetermined segment in accordance with particular code groups. The succession of magnitude and slope voltages and the associated evaluation process in response to successive code variations produces sine-cosine envelopes modulated upon the source frequency as a carrier. The output envelopes are suitable for a two phase synchro device or they may be converted to the number of phases required to operate a synchro device of more than two phases.

The above and other features of the invention will be described in the following detailed specification taken in connection with the drawings in which.

It is well established that a sinusoidal voltage may be represented by a rotating vector of fixed length. Likewise, a sinusoidal voltage approximated with straight line segments may be represented by an appropriate number of straight line segments located on the inside of the circle so defined as representing the sinusoidal voltage. The end of the rotating vector of the approximated sinusoid moves linearly along the straight line segments.

Figure 1:
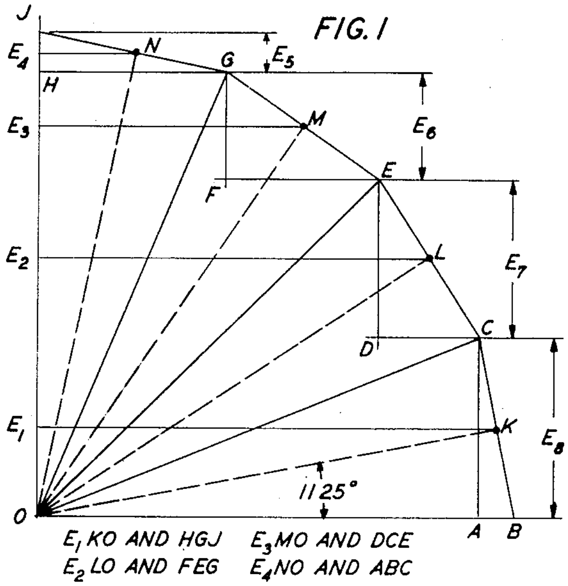
Fig. 1 is a vector diagram indicating the geometrical relationships between magnitude and slope voltages of a four segment (per quadrant) approximated sinusoid.

Fig. 1 is a representation of one quadrant of a four slope approximated sinusoid having points B, C, E, G, and J located on a circle with origin at O and corresponding to one quadrant of the sinusoidal voltage to be approximated. For convenience, OJ is assumed as the reference axis and the vertical distance parallel to or along the reference axis to the midpoint of each slope or segment is defined as a magnitude voltage. The difference between the magnitudes of the end points of each slope measured along the reference axis is defined as a slope voltage. It may be seen by inspection of Fig. 1 that certain triangles, indicated thereon, are similar. The similar triangles of interest in connection with the invention are indicated below Fig. 1.

The derivation of the geometrical relationships between slope voltages and magnitude voltage will now be explained. It may be shown by plane geometry that, as indicated on Fig. 1, certain right triangles are similar. For example, right triangles $E_1KO$ and HGJ may be shown to be similar as follows:

| | | |
|---|---|---|
| (1) | $\angle OE_1K=90°$ | By construction |
| (2) | $\angle E_1OK=11.25\times 7=78.75°$ | By construction |
| (3) | $\angle E_1OK+\angle OE_1K+\angle E_1KO=180°$ | Sum of angles of right triangle |
| (4) | $78.75°+90°+\angle E_1KO=180°$ | Substitution into step 3 |
| (5) | $\therefore \angle E_1KO=11.25°$ | Solution of step 4 |
| (6) | $\angle ONJ=90°$ | By construction |
| (7) | $\angle JON=11.25°$ | By construction |
| (8) | $\angle ONJ+\angle JON+\angle OJN=180°$ | Sum of angles of right triangle |
| (9) | $90°+11.25°+\angle OJN=180°$ | Substitution into step 8 |
| (10) | $\therefore \angle OJN=78.75°$ | Solution of step 9 |
| (11) | $\angle OJN=\angle HJG$ | Identical |
| (12) | $\angle JHG=90°$ | By construction |
| (13) | $\angle OJN+\angle JHG+\angle HGJ=180°$ | Sum of angles of right triangle |
| (14) | $78.75°+90°+\angle HGJ=180°$ | Substitution into step 13 |
| (15) | $\therefore \angle HGJ=11.25°$ | Solution of step 15 |
| (16) | $\therefore \triangle E_1KO$ similar to $\triangle HGJ$ | Corresponding angles being equal |

In a corresponding manner it may also be established that the following triangles are similar:

$E_2LO$ and FEG $E_3MO$ and DCE $E_4NO$ and ABC

In the case of similar triangles $E_1KO$ and HGJ and since the straight line segments BC, CE, etc., are of equal length by construction, the following relationship exists between sides:

$$\frac{E_1}{E_5}=\frac{KO}{GJ}=\frac{KO}{2KB}=\frac{1}{2}\cot.\ \angle KOB=\frac{1}{2}\cot.\ 11.25°$$

Likewise, the relationships between corresponding sides of the other similar triangles may be established as follows:

$$\frac{E_2}{E_6}=\frac{E_3}{E_7}=\frac{E_4}{E_8}=\frac{1}{2}\cot.\ 11.25°=\alpha=2.514$$

It should be noted from Fig. 1 that each straight line segment is related to particular magnitude and slope voltages. Moreover any of the straight line segments, as for example, BC, CE etc., can be obtained by combining with the magnitude voltage defining its midpoint chosen portions of the corresponding slope voltage as indicated in Fig. 1. Thus for the segment BC, the magnitude voltage $E_1$, chosen by the appropriate elements of the code, is combined with portions of slope voltage $E_8$ as determined by additional elements of the received code group. Here the lower limit B of segment BC is obtained by subtracting $$\frac{E_8}{2}\text{ from }E_1$$

The center of the segment is $E_1$ by definition and the upper limit is $$E_1+\frac{E_8}{2}$$

These limiting values are given in the equations below for each of the segments of Fig. 1. The remaining thirteen points of any segment are obtained by adding to or subtracting from the corresponding magnitude voltage portions of the associated slope voltage varying in steps between one-eighth and seven-eighths of the associated slope voltage:

$$BC=E_1\pm\frac{E_8}{2}=E_1\pm\frac{E_4}{2\alpha} \quad (1)$$

$$CE=E_2\pm\frac{E_7}{2}=E_2\pm\frac{\alpha E_3}{2\alpha} \quad (2)$$

$$DG=E_3\pm\frac{E_6}{2}=E_3\pm\frac{\alpha E_2}{2\alpha} \quad (3)$$

$$GJ=E_4\pm\frac{E_5}{2}=E_4\pm\frac{\alpha E_1}{2\alpha} \quad (4)$$

As the principal application of the invention, a synchro device is so driven that the angular position of the synchro represents a received code group. It is well established that analog devices of the synchro type require at least two voltages for operation, and that if only two voltages are employed these voltages should be spaced 90 degrees. Examination of segment Equations 1 through 4 reveals that magnitude voltages $E_1$ and $E_4$ are used to generate segments BC and GJ. Likewise magnitude voltages $E_2$ and $E_3$ are used to produce segments CE and DG. It is apparent, therefore, that two magnitude voltages can produce two segments provided each magnitude is multiplied by the reciprocal of cot. 11.25° and the product is properly combined with the opposite magnitude. Moreover, the successive generation of segments BC, CE, etc., develop these sequences of segments:

| | |
|---|---|
| BC | JG |
| CE | GE |
| EG | EC |
| GJ | CB |

It is evident that the envelopes formed by the segments are quadrants of approximate sinusoids, which are in quadrature. The synchro device will rotate in response to the approximated sinusoids, and the accuracy of reproduction of the encoded analog signal is limited principally by the precision of the synchro device.

Thus, the recognition that approximate sinusoids may be constructed from slope and magnitude voltages and that slope and magnitude voltages of segments of two approximated sinusoids occurring in quadrature are related by the same constant makes it possible to employ two identical circuits to generate the voltages of a segment. The required voltages derived from these two circuits are combined to produce two sinusoids simultaneously, thus greatly simplifying both the conversion process and the necessary equipment.

Figure 2:
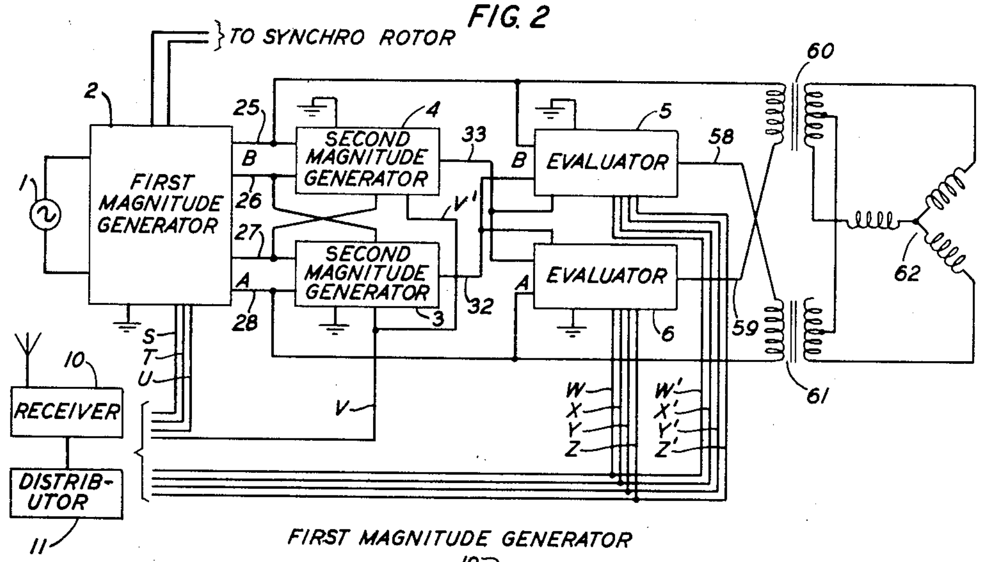
Fig. 2 is a schematic circuit diagram of one embodiment of the binary converter according to the invention.

As shown in Fig. 2, a receiver 10 and distributor 11 of any conventional design receive the binary code groups which represent shaft positions such that the full progression of the code groups describes a single revolution of the shaft. The eight code pulses of a group are distributed to occur simultaneously in parallel channels S, T, U, V, W, X, Y, Z corresponding respectively to the individual digits of the code. It was found in the construction of the four segment converter that less complicated circuitry was required if the magnitudes for the converter were developed in two operations. The first operation being the generation of two voltages with one of the voltages being half way between the two lower magnitudes of the converter and the other voltage being half way between the two higher magnitudes of the converter. The second operation in the generation of the converter's magnitude is to add and subtract consecutively different constant voltages, respectively from the voltages produced by the first operation thereby producing the required number of magnitudes for the four segment converter. Thus, first magnitude generator 2 accepts the three most significant code digits and modulates a source of single phase alternating potential 1 to produce two magnitudes in two channels A and B. The envelopes of the magnitudes in the channels are roughly sinusoidal and occur in quadrature. The outputs of channels A and B are supplied to second magnitude generators 3 and 4, respectively wherein the number of magnitudes available in each channel is increased to four under the control of the fourth most significant code digit. The output envelopes of the second magnitude generator in each channel are more closely sinusoidal than the outputs of the first magnitude generator since they describe four slope approximated sinusoids. It will be noted that lead 27 of output channel A of first magnitude generator 2 is connected to second magnitude generator 4 and lead 26 of output channel B is connected to second magnitude generator 3. It will be established hereinafter that it is necessary to combine the voltage of one channel with a constant voltage in order to obtain the four magnitudes required for four segment approximation as employed in the embodiment of the converter here described. The outputs 32 and 33 from the second magnitude generators 3 and 4, respectively, are paired with input leads 28 and 25, respectively referred to or the reference leads connected to reform channels A and B. That is, output lead 32 is paired with lead 25 of channel B and outlead 33 is paired with lead 28 of channel A. The reformed channels A and B form inputs to evaluators 6 and 5 respectively which also accept the remaining digits of the code groups to produce the slope voltages required for combination with the magnitude voltages produced in the opposite channels (B and A, respectively).

The slope voltage of an evaluator is combined with the magnitude occurring in the other channel through pairing evaluator output leads 58 and 59 with reference leads 28 and 25, respectively, to produce approximated sinusoidal voltages in quadrature. It is apparent that with each code group supplied to the converter a corresponding set of output voltages is produced, and these voltages representative of the transmitter shaft position may be applied to a two phase synchro device for rotation of the synchro rotor to the transmitter shaft position. As disclosed in the embodiment the evaluator outputs are supplied to Scott-connected transformers 60 and 61 to produce three voltages for application to the more common three phase synchro device.

Having described the operation of the four segment converter in a general manner the individual components will now be explained in more specific detail.

Figure 3:
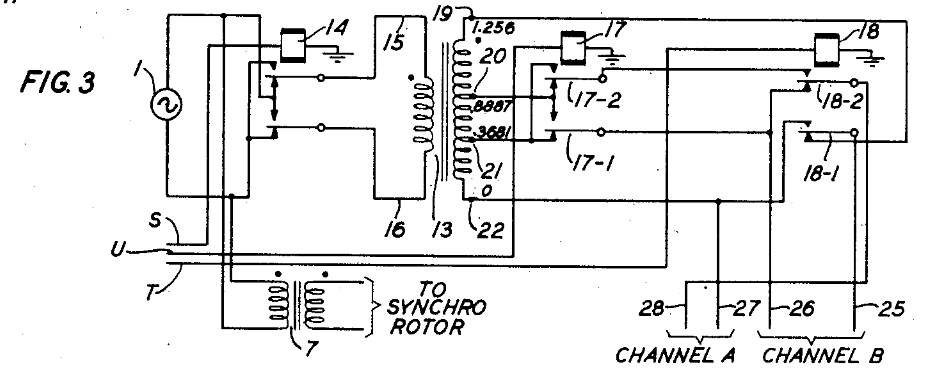
Fig. 3 is a schematic circuit diagram of the first magnitude generator included in Fig. 1.

Referring to Fig. 3, the source of potential 1 having an amplitude E is selected of suitable frequency for operating a synchro device 62 the stator of which may be connected across the converter output or as shown to the output of two transformers connected to the converter output for the purpose of increasing the number of voltages applied to the synchro windings. The source of potential 1 is connected to the primary winding of a power transformer 13 through the contacts of a double-pole double-throw relay 14 which reverses the instantaneous polarity with respect to a reference level of the envelope applied to transformer 13 in response to the most significant digit of the received code group.

Source 1 is also coupled to the rotor of the synchro device 60 through transformer 7 which produces the required voltage in the synchro necessary to interact with the stator voltage to generate motor action in the synchro.

The secondary of transformer 13 is provided with terminals 19, 20, 21 and 22 corresponding respectively to 1.2568E, 0.8887E, 0.3681E and OE or reference level taps, and these taps must be selected so that the voltage outputs of first magnitude generator 2 occur half way between the two higher and two lower magnitudes of the four segment converter.

Figure 4:
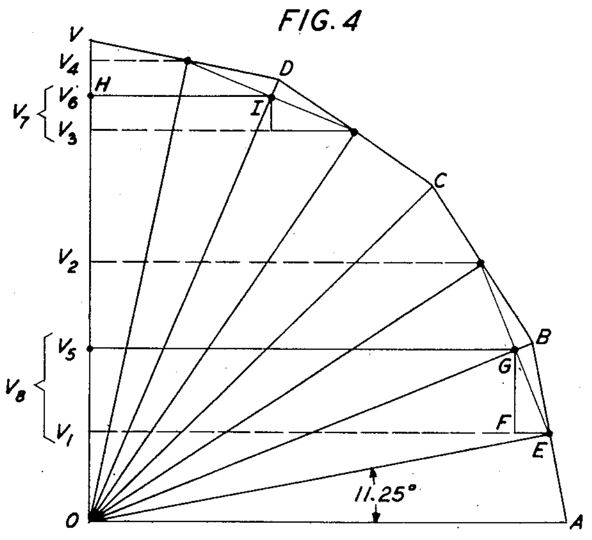
Fig. 4 is a vector diagram indicating geometrical relationships in the second magnitude generators.

The method of selecting the taps is to determine the required voltage outputs of first magnitude generator 2 by considering Fig. 4 which shows one quadrant of a sinusoidal voltage with OV as the reference axis. The four segments of one quadrant of an approximated sinusoid are shown as AB, BC, CD and DV with the midpoint of each segment projected on to OV as $V_1$, $V_2$, $V_3$ and $V_4$, respectively. It is apparent that $V_6$ and $V_5$ are half way between the two higher and two lower magnitudes of the four segment converter. It may be readily shown that $V_5=E\cos^2 11.25 \sin 22.5°$ and $V_6=E\cos^2 11.25° \sin 67.5°$ and the output voltages of first magnitude generator 2 are .3681E and .8887E, respectively.

Since the output voltages of generator 2 must occur in two channels in quadrature then one set of voltages occurs between .8887E–OE taps and .3681E–OE taps. The other set of voltages occurs between 1.2568E–.3681E taps and 1.2568E–.8887E taps.

Two relays 17 and 18 each having two sets of contacts are connected to these terminals through suitable leads. Terminal 20 or the .8887E tap is connected to the outer front and inner back contacts of relay 17. Terminal 21 or the .3681E tap is connected to the remaining contacts of relay 17. Terminals 19 and 22 or the reference level and 1.2568E taps respectively of transformer 13 are connected to the outer front and back contacts of relay 18. The inner back and inner front contacts of relay 18 are respectively connected to outer armature 17–1 and inner armature 17–2 of relay 17. One channel referred above to as channel B is taken between armature 18–1 of relay 18 and armature 17–1 of relay 17 and appears as leads 25 and 26. The second channel referred to as the A channel is taken between the reference level terminal 22 and armature 18–2 of relay 18 and appears between leads 27 and 28. The three most significant digits of a received binary code group arrange the contacts of relays 14, 17 and 18 to produce simultaneously magnitude voltages of 0.3681E and 0.8887E where E is the output from source 1. A code group is represented by "0" and "1" symbols where "0" is an "off" pulse which does not operate a relay and "1" is an "on" pulse which does operate a relay. The magnitude voltages occur in opposite order in each channel, and the order of occurrence of the magnitude voltages in each channel 1 produces envelopes which are in quadrature for successive variations of the code groups.

For example, if code group 000 is arbitrarily selected as being applied to relays 14, 17 and 18 then the voltages appearing on the output leads of channel B are 1.2568E and .3681E with the voltage difference being .8887E. Simultaneously, the voltages appearing on the output leads of channel A are O and .3681E with the voltage difference equal to .3681E. It is apparent that the operation of relay 17 interchanges the voltages appearing in channels B and A. The operation of relay 18 also interchanges the voltages appearing in channels A and B as well as reversing the polarity of the voltage appearing in channel A. Relay 14 changes the polarity of the voltages appearing in both channels A and B. The effect of double reversing relays 17 and 18 and relay 14 is to produce magnitude voltages whose envelopes roughly follow the form of a sine-cosine function in response to successive code variations.

Table I below discloses the voltages produced in each channel for every code input supplied to the relays of Fig. 3. It should be noted that Table I represents the changes of the three most significant digits of an eight digit code. The digits of lesser significance of the code group complete 32 successive variations between changes of these three digits and this fact is illustrated by the vertical dots. The polarity of the voltages is assumed positive if the potential of lead 28 is greater than the potential of lead 27 in channel A and assumed positive in channel B if the potential of lead 26 is greater than the potential of lead 25.

*Table I*

| Code significance | | | Channel voltages | |
|---|---|---|---|---|
| Relay 14 I | Relay 18 II | Relay 17 III | A | B |
| 0 | 0 | 0 | .3681E | −.8887E |
| : | : | : | | |
| 0 | 0 | 1 | .8887 | −.3681 |
| : | : | : | | |
| 0 | 1 | 0 | .8887 | .3681 |
| : | : | : | | |
| 0 | 1 | 1 | .3681 | .8887 |
| : | : | : | | |
| 1 | 0 | 0 | −.3681 | .8887 |
| : | : | : | | |
| 1 | 0 | 1 | −.8887 | .3681 |
| : | : | : | | |
| 1 | 1 | 0 | −.8887 | −.3681 |
| : | : | : | | |
| 1 | 1 | 1 | −.3681 | −.8887 |

Figure 5:
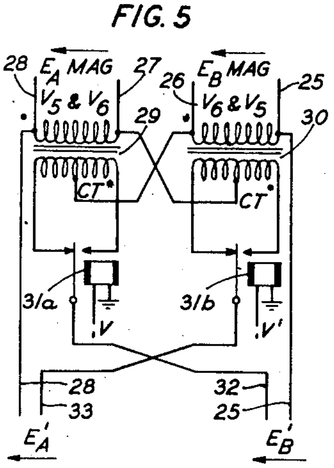
Fig. 5 is a schematic circuit diagram of the second magnitude generators included in Fig. 1.

The two magnitudes produced by the first magnitude generator are converted according to code progression into four magnitude voltages by each of the second magnitude generators which are shown in more detail in Fig. 5. The method of operation of these circuits is best understood through consideration of the chart in Fig. 4.

The differences between $V_6$ and $V_3$ and $V_4$ and $V_6$ are the same and referred to as $V_7$. Similarly the differences between $V_2$ and $V_5$ and $V_5$ and $V_1$ are the same and referred to as $V_8$. It will now be shown that a geometrical relationship may be developed whereby the voltages $V_7$ or $V_8$ may be obtained from $V_5$ or $V_6$ in a manner similar to that described for Fig. 1.

Considering triangles AFE and OHI of Fig. 4, it may be seen that the angles between corresponding sides of the triangles are equal. Therefore the triangles are similar right triangles and the ratio of vertical legs ($V_6$ and $V_8$) is proportional to the ratio of hypotenuses (OI and EG). OI and OG are equal by construction and consequently the cotangent of <EOG which is 11.25° may be substituted for the relationship $$\frac{OG}{EG}$$

Thus, $V_8$ may be equal to $V_6 \div \cot. 11.25°$. In a corresponding manner, it may be readily established that $V_7$ is equal to $V_5 \div \cot. 11.25°$.

With reference to Fig. 2 it will be observed that channels A and B from the first magnitude generator are each connected to second magnitude generators 3 and 4, and Fig. 5 indicates the connection. Lead 28, of channel A is directly connected to transformer 29. Whereas, lead 27 is directly connected to transformer 29 and the center tap on the secondary of transformer 30. In a corresponding manner, lead 25 of channel B is directly connected to transformer 30 whereas lead 26 is directly connected to transformer 29 and the center tap on the secondary of transformer 29. For the sake of simplicity only second magnitude generator 3 will be described since generators 3 and 4 operate in a similar manner. A relay 31(*a*) operates in response to the fourth code digit in order of descending significance and its contacts permits selection of the upper or lower half of the secondary of transformer 29 as a source of output voltage. The output voltage from generator 3 is taken from armature 32 of relay **31*a*. The turns ratio of transformer 29 equals 2.513:1 with the secondary voltage to the center tap being equal to $E \div 5.027$ or $E \div \cot. 11.25°$ where E is the magnitude voltage appearing in channel A. The fourth digit of the code which is supplied to relay 31*a*, alternates between "0" and "1" for successive groups of the four digits of a code and causes relay 31*a* to appropriately add or subtract $E \div \cot. 11.25°$ to the magnitude voltage appearing at the center tap of transformer 29. It will be recalled that the center tap of transformer 29 is connected to lead 26** of channel B thereby combining a portion of the magnitude in channel A with the magnitude in channel B.

Arbitrarily assuming $V_5$ in channel A and $V_6$ in channel B then $V_5 \div \cot. 11.25°$ or $V_7$ is combined with $V_6$ in channel B. Likewise, $V_6 \div \cot. 11.25°$ or $V_8$ in channel B is combined with $V_5$ in channel A as is required in the case of Fig. 4. Since the transformers are identical the appearance of $V_6$ in channel A and $V_5$ in channel B will enable $V_7$ or $V_8$ to be combined with the proper magnitude.

In order to obtain $V_1$ through $V_4$ as an output from generators 3 and 4 it is necessary that the voltage selected by relay **31*a* which appears on lead 32 be paired with the voltage on lead 26 of channel B. Correspondingly, the voltage selected by relay 31*b* which appears on lead 33 be paired with the voltage on lead 28 of channel A since the voltages on leads 28 and 25** are the references for the magnitudes in channels A and B respectively.

Table II shown below indicates the voltage produced by generators 2, 3 and 4 for the first four digits (in order of decreasing significance) of the received code groups. Again it should be noted that Table II represents the sequences of the first four digits of an eight digit code. The remaining digits of the code complete sixteen successive variations between changes of these four digits.

*Table II*

| Code significance and relay Nos. | | | | Magnitude for $E_A'$ | Magnitude for $E_B'$ |
|---|---|---|---|---|---|
| 14 | 18 | 17 | 32 | | |
| I | II | III | IV | | |
| 0 | 0 | 0 | 0 | $V_5-V_8(V_1)$ | $-V_6-V_7$ |
| 0 | 0 | 0 | 1 | $V_5+V_8(V_2)$ | $-V_6+V_7$ |
| 0 | 0 | 1 | 0 | $V_6-V_7(V_3)$ | $-V_5-V_8$ |
| 0 | 0 | 1 | 1 | $V_6+V_7(V_4)$ | $-V_5+V_8$ |
| 0 | 1 | 0 | 0 | $V_6+V_7$ | $V_5-V_8$ |
| 0 | 1 | 0 | 1 | $V_6-V_7$ | $V_5+V_8$ |
| 0 | 1 | 1 | 0 | $V_5+V_8$ | $V_6-V_7$ |
| 0 | 1 | 1 | 1 | $V_5-V_8$ | $V_6+V_7$ |
| 1 | 0 | 0 | 0 | $-V_5+V_8$ | $V_6+V_7$ |
| 1 | 0 | 0 | 1 | $-V_5-V_8$ | $V_6-V_7$ |
| 1 | 0 | 1 | 0 | $-V_6+V_7$ | $V_5+V_8$ |
| 1 | 0 | 1 | 1 | $-V_6-V_7$ | $V_5-V_8$ |
| 1 | 1 | 0 | 0 | $-V_6-V_7$ | $-V_5+V_8$ |
| 1 | 1 | 0 | 1 | $-V_6+V_7$ | $-V_5-V_8$ |
| 1 | 1 | 1 | 0 | $-V_5-V_8$ | $-V_6+V_7$ |
| 1 | 1 | 1 | 1 | $-V_5-V_8$ | $-V_6-V_7$ |

Since the voltages $V_5$ and $V_6$ were given in Table I as .3681E and .8887E respectively with respect to the potential source 1 and $V_7$ and $V_8$ are readily evaluated as .0703E and .1768E from the discussion on Fig. 4 then Table II may be rewritten in terms of the potential source 1 of amplitude E. The polarity of the voltages is assumed positive if the potential of lead 28 is greater than the potential of lead 33 in channel A and assumed positive in channel B if the potential of lead 32 is greater than the potential of lead 25.

*Table III*

| | $E_A'$ | $E_B'$ |
|---|---|---|
| 0000 | .1913E | -.9619E |
| 0001 | .5449 | -.8155 |
| 0002 | .8155 | -.5449 |
| 0003 | .9619 | -.1913 |
| 0004 | .9619 | .1913 |
| 0005 | .8153 | .5449 |
| 0006 | .5449 | .8153 |
| 0007 | .1913 | .9619 |
| 0008 | -.1913 | .9619 |
| 0009 | -.5449 | .8155 |
| 0010 | -.8153 | .5449 |
| 0011 | -.9619 | .1913 |
| 0012 | -.9619 | -.1913 |
| 0013 | -.8153 | -.5449 |
| 0014 | -.5449 | -.8155 |
| 0015 | -.1913 | -.9619 |

The outputs from generators 3 and 4 are respectively connected to evaluators 6 and 5, wherein the slope voltages are produced and supplied as an output in selected portions for combination with magnitude voltages in opposite channels under the control of the remaining digits of the code.

Figure 6:
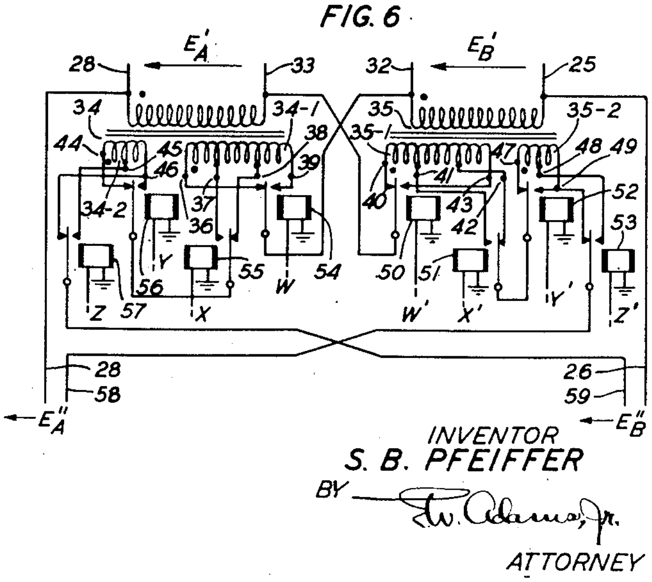
Fig. 6 is a schematic circuit diagram of the evaluators included in Fig. 1.

Fig. 6 is a schematic diagram of evaluators 5 and 6 in channels B and A. Transformer 34 of evaluator 6 is connected across leads 28 and 33 of channel A, whereas transformer 35 is connected across leads 32 and 25 of channel B.

Transformer 34 has two secondary windings 34–1 and 34–2 and in a similar manner transformer 35 has two secondary windings 35–1 and 35–2. The transformation ratio of secondaries 34–1 and 35–1 are identical as is also the case for secondaries 34–2 and 35–2.

There are identical taps on secondaries 34–1 and 35–1 and the taps occur at full, three-quarter, one-quarter and zero winding points of the secondary. The taps are represented by terminals 36, 37, 38 and 39 for secondary 34–1 and terminals 40, 41, 42 and 43 for secondary 35–1. There are also identical taps on secondaries 34–2 and 35–2 and the taps occur at zero, half and full winding points on the secondaries. The taps are represented by terminals 44, 45 and 46 for secondary 34–2 and terminals 47, 48 and 49 for secondary 35–2.

The four remaining (least significant) digits of the code group are supplied to relays 50, 51, 52 and 53 located in the secondaries of evaluator 5 and to relays 54, 55, 56 and 57 located in the secondaries of evaluator 6. The relays control interconnections between the secondary windings of the evaluators to produce the appropriate slope voltage for combination with a magnitude. Each digit is supplied to two relays. The first digit of the group is supplied to relays 50 and 54 and the remaining digits in descending order of importance, are supplied to relays 51 and 55, 52 and 56, and 53 and 57, respectively.

For the purpose of brevity, the arrangement of the relays in the secondaries of only one evaluator will be described since the distribution of the relays in the secondaries of evaluators 5 and 6 is identical.

Referring to evaluator 5, in channel B, relay 50 operates to select between contacts connected to terminals 40 and 43 of secondary 35–1, the front and back contacts of relay 50 being connected to terminals 43 and 40, respectively. Relay 51 operates to select between contacts connected to terminals 41 and 42, the front and back contacts being connected to terminals 41 and 42, respectively. Relay 52 operates to select between contacts connected to terminals 47 and 49, the front and back contacts being connected to terminals 49 and 47, respectively. Relay 53 operates to select between contacts connected to terminals 48 and 49, the front and back contacts being connected to terminals 48 and 49, respectively. The armatures of relays 51 and 52 are connected together.

The slope voltage produced by evaluator 5 (described hereinafter) is supplied to the other channel for combination with the magnitude occurring simultaneously in the other channel by connecting the armature of relay 50 to lead 33 of channel A and pairing lead 58 from relay 53 of secondary 35–2 with lead 28 in channel A.

It will be recalled in accordance with the theory described in connection with Fig. 1 that the simultaneous combination of the magnitude voltage in one channel and the slope voltage in other channel will produce an output that falls along a straight line segment of an approximate sinusoid.

The transformation ratios for secondaries 35–1 and 35–2 with respect to the primary of transformer 35 is 5.027:1 and 20.12:1, respectively. The cotangent of 11.25° is 5.027 which permits the previous mentioned transformation ratios to be rewritten as cot. 11.25:1 and 4 cot. 11.25:1, respectively. In response to code digits, relays 50 . . . 53 operate to combine the secondary voltages of 35–1 and 35–2 to produce a slope voltage. Relay 50 selects the polarity of the voltage appearing in secondary 35–1. Relay 51 selects between one-quarter or three-quarters portion of this voltage, and supplies it to secondary 35–2. Relay 52 combines the voltage from secondary 35–1 and selects the polarity of the voltage in 35–2. Relay 53 selects between zero and half of the combined voltage appearing in secondary 35–2.

The operation of relays 50, 51, 52 and 53 may be more fully understood with the aid of Table IV which indicates the voltage appearing at the output of evaluator 5 for all sucessive code inputs applied to the relays if second magnitude generator outputs $V_1$ and $V_4$ are arbitrarily assumed as being supplied to the inputs of evaluators 5 and 6, respectively. On Fig. 1, $V_1$ and $V_4$ are shown as $E_1$ and $E_4$ respectively. It should also be remembers from Fig. 1 that $E_4/E_8=\frac{1}{2}$ cot. 11.25 since this substitution is necessary to show the output voltage in a different form.

*Table IV*

| Relay code input | | | | Input volt. relay 50 | + Secondary voltage 35-1 | + Secondary voltage 35-2 | = Output voltage |
|---|---|---|---|---|---|---|---|
| 50 | 51 | 52 | 53 | | | | |
| 0 | 0 | 0 | 0 | $E_1$ | $-3E_4\div 4$ cot. 11.25 | $-E_4\div 4$ cot. 11.25 | $E_1-\frac{E_8}{2}$ |
| 0 | 0 | 0 | 1 | $E_1$ | $-3E_4\div 4$ cot. 11.25 | $-E_4\div 8$ cot. 11.25 | $E_1-\frac{7}{16}E_8$ |
| 0 | 0 | 1 | 0 | $E_1$ | $-3E_4\div 4$ cot. 11.25 | 0 | $E_1-\frac{6}{16}E_8$ |
| 0 | 0 | 1 | 1 | $E_1$ | $-3E_4\div 4$ cot. 11.25 | $+E_4\div 8$ cot. 11.25 | $E_1-\frac{5}{16}E_8$ |
| 0 | 1 | 0 | 0 | $E_1$ | $-E_4\div 4$ cot. 11.25 | $-E_4\div 4$ cot. 11.25 | $E_1-\frac{4}{16}E_8$ |
| 0 | 1 | 0 | 1 | $E_1$ | $-E_4\div 4$ cot. 11.25 | $-E_4\div 8$ cot. 11.25 | $E_1-\frac{3}{16}E_8$ |
| 0 | 1 | 1 | 0 | $E_1$ | $-E_4\div 4$ cot. 11.25 | 0 | $E_1-\frac{2}{16}E_8$ |
| 0 | 1 | 1 | 1 | $E_1$ | $-E_4\div 4$ cot. 11.25 | $+E_4\div 8$ cot. 11.25 | $E_1-\frac{1}{16}E_8$ |
| 1 | 0 | 0 | 0 | $E_1$ | $+E_4\div 4$ cot. 11.25 | $-E_4\div 4$ cot. 11.25 | $E_1$ |
| 1 | 0 | 0 | 1 | $E_1$ | $+E_4\div 4$ cot. 11.25 | $-E_8\div 8$ cot. 11.25 | $E_1+\frac{1}{16}E_8$ |
| 1 | 0 | 1 | 0 | $E_1$ | $+E_4\div 4$ cot. 11.25 | 0 | $E_1+\frac{2}{16}E_8$ |
| 1 | 0 | 1 | 1 | $E_1$ | $+E_4\div 4$ cot. 11.25 | $+E_4\div 8$ cot. 11.25 | $E_1+\frac{3}{16}E_8$ |
| 1 | 1 | 0 | 0 | $E_1$ | $+3E_4\div 4$ cot. 11.25 | $-E_4\div 4$ cot. 11.25 | $E_1+\frac{4}{16}E_8$ |
| 1 | 1 | 0 | 1 | $E_1$ | $+3E_4\div 4$ cot. 11.25 | $-E_4\div 8$ cot. 11.25 | $E_1+\frac{5}{16}E_8$ |
| 1 | 1 | 1 | 0 | $E_1$ | $+3E_4\div 4$ cot. 11.25 | 0 | $E_1+\frac{6}{16}E_8$ |
| 1 | 1 | 1 | 1 | $E_1$ | $+3E_4\div 4$ cot. 11.25 | $+E_4\div 8$ cot. 11.25 | $E_1+\frac{7}{16}E_8$ |
| 0 | 0 | 0 | 0 | $E_2$ | $-3E_3\div 4$ cot. 11.25 | $-E_3\div 4$ cot. 11.25 | $E_2-\frac{E_7}{2}$ |
| : | : | : | : | : | | | |

It will be recognized that evaluator 6 in channel A operates on the magnitude voltage $E_1$ (in the assumed case) to produce a slope voltage which is combined with the magnitude $E_4$ occurring simultaneously (in the assumed case) in channel B. The method of combining these voltages for evaluator 6 is accomplished through connecting the armature of relay 54 to lead 32 of channel B and pairing the output of evaluator 6 which appears on lead 59 with lead 25 of channel B. It is apparent that the interconnection for evaluators 5 and 6 and channels B and A respectively are similar.

The output voltage of channel A with respect to the potential source 1 is obtained by substituting $V_1$ and $V_4$ (given in Table III with respect to E) for $E_1$ and $E_4$ in Table IV since the reference for the slope voltage of lead 28, the same lead that is paired with the output of evaluator 5 which appears on lead 58. A table may be prepared of the output voltages for channels A and B with respect to source 1 by substituting into Table IV and an equivalent table for evaluator 6 (not shown) the magnitude and slope voltages in terms of potential source 1. These substitutions which may be readily shown are as follows:

$$E_1=.1913E \qquad E_8=E_4/2.514=.3826E$$
$$E_2=.5449E \qquad E_7=E_3/2.514=.3243E$$
$$E_3=.8155E \qquad E_6=E_2/2.514=.2127E$$
$$E_4=.9619E \qquad E_5=E_1/2.514=.0761$$

In Table V the output voltages in channels 4 and 3 are shown for every eighth code group, and a plot of voltage as ordinate against code group as abscissa will indicate that the converter's outputs are two approximated sinusoids in quadrature.

The outputs of channels A and B are directly connected to power transformers 61 and 60 as shown in Fig. 2. The secondaries of transformers 60 and 61 are interconnected in the well known Scott connection to produce three voltages for application to the windings of a three phase synchro device 62. The envelopes of the three voltages produced in the Scott-connected transformer are of equal amplitude and spaced 120 degrees.

The rotor (not shown) of synchro 62 is excited with suitable voltage from source 1 which produces an alternating flux in the synchro rotor. The outputs from Scott-connected transformers 60 and 61 are applied to the stator of the synchro so that they occur in space phase relations with respect to each other. The stator voltages produce an alternating flux which interacts with the rotor flux resulting in a torque that causes the rotor to rotate to a position in which the axis of both fluxes are in parallel and aiding.

It should be noted, however, that the outputs of channels A and B are suitable for two phase synchro operation but in the present embodiment they were converted to three outputs for use with the more common three phase synchro unit.

*Table V*

| Code group number | Code group | | | | | | | | $E_A''$ output | $E_B''$ output |
|---|---|---|---|---|---|---|---|---|---|---|
| 0 | 0 | 0 | 0 | 0 | 0 | 0 | 0 | 0 | 0E | −1.000E |
| 8 | 0 | 0 | 0 | 0 | 1 | 0 | 0 | 0 | .1913 | −.9619 |
| 16 | 0 | 0 | 0 | 1 | 0 | 0 | 0 | 0 | .3826 | −.9219 |
| 24 | 0 | 0 | 0 | 1 | 1 | 0 | 0 | 0 | .5449 | −.8155 |
| 32 | 0 | 0 | 1 | 0 | 0 | 0 | 0 | 0 | .7071 | −.7071 |
| 40 | 0 | 0 | 1 | 0 | 1 | 0 | 0 | 0 | .8155 | −.5449 |
| 48 | 0 | 0 | 1 | 1 | 0 | 0 | 0 | 0 | .9219 | −.3826 |
| 56 | 0 | 0 | 1 | 1 | 1 | 0 | 0 | 0 | .9619 | −.1913 |
| 64 | 0 | 1 | 0 | 0 | 0 | 0 | 0 | 0 | 1.000 | −0 |
| 72 | 0 | 1 | 0 | 0 | 1 | 0 | 0 | 0 | .9619 | .1913 |
| 80 | 0 | 1 | 0 | 1 | 0 | 0 | 0 | 0 | .9219 | .3826 |
| 88 | 0 | 1 | 0 | 1 | 1 | 0 | 0 | 0 | .8155 | .5449 |
| 96 | 0 | 1 | 1 | 0 | 0 | 0 | 0 | 0 | .7071 | .7071 |
| 104 | 0 | 1 | 1 | 0 | 1 | 0 | 0 | 0 | .5449 | .8155 |
| 112 | 0 | 1 | 1 | 1 | 0 | 0 | 0 | 0 | .3826 | .9219 |
| 120 | 0 | 1 | 1 | 1 | 1 | 0 | 0 | 0 | .1913 | .9619 |
| 128 | 1 | 0 | 0 | 0 | 0 | 0 | 0 | 0 | 0 | 1.000 |
| 136 | 1 | 0 | 0 | 0 | 1 | 0 | 0 | 0 | −.1913 | .9619 |
| 144 | 1 | 0 | 0 | 1 | 0 | 0 | 0 | 0 | −.3826 | .9219 |
| 152 | 1 | 0 | 0 | 1 | 1 | 0 | 0 | 0 | −.5449 | .8155 |
| 160 | 1 | 0 | 1 | 0 | 0 | 0 | 0 | 0 | −.7071 | .7071 |
| 168 | 1 | 0 | 1 | 0 | 1 | 0 | 0 | 0 | −.8155 | .5449 |
| 176 | 1 | 0 | 1 | 1 | 0 | 0 | 0 | 0 | −.9219 | .3826 |
| 184 | 1 | 0 | 1 | 1 | 1 | 0 | 0 | 0 | −.9619 | .1913 |
| 192 | 1 | 1 | 0 | 0 | 0 | 0 | 0 | 0 | −.000 | 0 |
| 200 | 1 | 1 | 0 | 0 | 1 | 0 | 0 | 0 | −.9619 | −.1913 |
| 208 | 1 | 1 | 0 | 1 | 0 | 0 | 0 | 0 | −.9219 | −.3826 |
| 216 | 1 | 1 | 0 | 1 | 1 | 0 | 0 | 0 | −.8155 | −.5449 |
| 224 | 1 | 1 | 1 | 0 | 0 | 0 | 0 | 0 | −.7071 | −.7071 |
| 232 | 1 | 1 | 1 | 0 | 1 | 0 | 0 | 0 | −.5449 | −.8155 |
| 240 | 1 | 1 | 1 | 1 | 0 | 0 | 0 | 0 | −.3820 | −.9219 |
| 248 | 1 | 1 | 1 | 1 | 1 | 0 | 0 | 0 | −.1913 | −.9619 |
| 255 | 1 | 1 | 1 | 1 | 1 | 1 | 1 | 1 | −.0235 | −.9952 |

Briefly summarizing, the converter accomplishes simultaneous decoding and synthesizing of outputs through the operation of relays in response to the four most significant digits of code to produce magnitude voltages that are located at the midpoints of straight line segment comprising approximated-sinusoids. The magnitude voltages are obtained by modulating a single phase alternating current supply of suitable frequency for operating a synchro device. The remaining half or less significant part of the code operates relays to produce from the magnitude voltages successively increasing or decreasing portions of slope voltages. The slope and magnitude voltages of opposite channels are combined by suitable connecting means, and the combination of slope and magnitude voltage produces approximated-sinusoids composed of straight line segments with the sinusoids being in quadrature.

It should be understood that the invention is not limited to the converter as disclosed in the described embodiment of the invention. Moreover, the accuracy of sinusoidal reproduction increases with the number of straight line segments. The invention contemplates the use of converters having more or less than four straight line segments per quadrant of a sinusoid depending upon the number of code digits taken in order of decreasing significance that are employed for selecting the number and polarity of magnitude voltages located on straight line segments. Likewise, the number of evaluation points may be varied by chinging the number of the remaining code digits which are supplied to the evaluators. Thus, any code group comprises two subgroups of digits, and each subgroup individually may be increased or decreased to produce a converter having the desired number of segments with the proper number of evaluation points or quantizing intervals on a segment. The subgroup of digits comprising the more significant digits controls the number and polarity of the straight line segments. The remaining subgroup controls the quantizing interval of the evaluators.

As an example, a converter using sinusoids composed of two straight line segments would require only three digits for generation of magnitude voltages since the evaluator could be directly connected to the evaluators instead of being connected to the second magnitude generator shown in Fig. 5. Similarly, an eight segment converter would require five digits for generation of straight line segments since another relay would be required in conjunction with relay 30 to repeat a similar process to that discussed in connection with Fig. 4. In connection with the generation of straight line segments it should be noted that successive digit increases in the subgroup comprising the more significant digits enables the number of straight line segments to be doubled. The employment of each code digit for accomplishment of a particular operation is referred to as one hundred percent code efficiency. Sinusoids composed of three or five straight line segments, may be obtained by reducing the code efficiency of a group that is capable of producing a greater number of straight line segments.

It can be shown that the number of straight line segments for a converter is related to the number of code digits in the more significant subgroup by the relationship $y=2+\log_2 x$ where $x$ is the number of straight line segments (per quadrant), and $y$ is the number of code digits in the more significant subgroup. The foregoing relationship may be verified by substituting for $x$ and comparing the solutions with the converters described above.

The geometrical relationship between slope and magnitude voltages was given for a sinusoid composed of four straight line segments. Further consideration of Fig. 1 will indicate that the cotangent relationship will change in proportion to the number of straight line segments. It may be readily established that the geometrical relationship between slope and magnitude voltages, for any number of straight line segments is given by the following:

$$E_A \text{ (magnitude) } E_B \text{ (slope)} = \tfrac{1}{2} \cot. 45°/n'$$

In the above ratio, $n'$ is the number of straight line segments, and one hundred percent code efficiency is assumed.

It is a less complicated process to increase or decrease the accuracy of the converter by varying the quantizing interval of the evaluator. The complexity of the converter increases directly with the number of slopes desired, and for the sake of simplicity it may be more desirable to increase the accuracy of a converter by increasing the quantizing interval rather than increasing the number of straight line segments of the sinusoidal envelope. It is obvious, however, that the accuracy of the converter is less affected by the variations of the evaluators quantizing intervals than by changing the number of straight line segments. The quantizing interval of the evaluators is increased or decreased by adding or subtracting an additional relay to the secondary of the transformers located in the evaluators and causing the digits to be weighted $2^{-n+1}$ where $n$ is the number of digits supplied to the evaluator.

What is claimed is:

1. A pulse converter for decoding successive binary code groups of elements representing the successive angular positions of a rotating member and producing an alternating current voltage having an approximately sinusoidal envelope bounded by a number of segments, means distributing the elements of received code groups for simultaneous occurrence, a source of alternating current, means responsive to one portion of each code group for producing from said source sequences of magnitudes roughly approximating sinusoids, at least one evaluator responsive to the remaining elements of said code groups for producing slope voltages corresponding to said magnitudes, and means for combining selected magnitude and slope voltages to produce a wave having an approximated-sinusoidal form.

2. A pulse converter for decoding successive binary code groups of digits representing the successive angular positions of a rotating shaft and simultaneously producing at least two alternating current voltages having envelopes bounded by a selected number of straight line segments and approximating sinusoidal form comprising, means for distributing the $n$ digits of a received code group for simultaneous occurrence, a source of alternating current of desired frequency, first means connected to the source for producing in at least two channels sequences of voltages corresponding to the midpoints of the segments in response to the more significant portion of the code, evaluation means in each channel to accept the sequences of midpoint voltages and produce predetermined portions of voltage slopes in response to the remaining portion of the code, means in each channel to combine the midpoint voltage in that channel with the predetermined portions of its associated slope voltage in a different channel to produce in at least two output circuit envelopes bounded by a selected number of straight line segments approximating sinusoidal form.

3. A pulse converter for decoding successive binary code groups of digits representing the successive angular positions of a rotating shaft and simultaneously producing at least two alternating current voltages having envelopes bounded by a selected number of straight line segments and approximating sinusoidal form comprising, means for distributing the $n$ digits of a received code group for simultaneous occurrence, a source of alternating current of desired frequency, means for receiving the alternating current and employing one portion of the code group to produce in first and second channels sequences of envelope magnitudes roughly approximating sinusoids the sequences in the two channels being in quadrature, an evaluator for each channel response to the remaining digits to accept each successive magnitude of a sequence from said last mentioned means and produce as an output slope voltage a predetermined portion of the magnitude, the portions varying stepwise between two limits, the first being the magnitude voltage in the other channel less half said portion, said other limit being said magnitude voltage plus half said portion, and connecting means for supplying the slope voltage from the evaluator in each channel and the magnitude occurring simultaneously at the input of the evaluator in the other channel to produce sinusoids in each of two output circuits corresponding respectively to said first and second channels.

4. A pulse converter for decoding successive binary code groups of digits representing the successive angular positions of a rotating member and producing at least two alternating current voltages having envelopes bounded by a selected number of segments and approximating sinusoidal form comprising, means for distributing the $n$ digits of a received code group for simultaneous occurrence, a source of alternating current, means connected to the source for producing in at least two channels sequences of voltages defining common points of two segments in response to one portion of the code, means in each channel responsive to the next digit of said code for producing from said sequences voltages defining the midpoint of each segment, evaluation means in each channel to accept the sequences of midpoint voltages and produce predetermined portions of a slope voltage in response to the remaining portion of the code, means in each channel to combine the midpoint voltage of that channel with the predetermined portion of associated slope voltage in a different channel to produce voltage envelope approximating sinusoidal form of different relative phase in output circuits corresponding respectively to each channel.

5. Apparatus as defined in claim 4 wherein the means response to the next digit comprises means connected across each channel for producing a predetermined portion of the voltage in that channel and algebraically combining that portion with the voltage simultaneously occurring in the other channel whose envelope is in quadrature.

6. A pulse converter as defined in claim 1 wherein means connected to said two output circuits are arranged for deriving from the sinusoids occurring therein three voltage envelopes of equal amplitude spaced 120 degrees.

7. Apparatus as defined in claim 4 wherein the evaluation means comprises means for receiving magnitudes in the channel to which it is connected and producing two pairs of output voltages of related amplitudes, said outputs in each pair being in phase opposition, first selecting means under the control of the first digit in order of decreasing significance of the remaining code portion for selecting between the outputs of the first pair to obtain a quantity for combination with the magnitude occurring simultaneously in the other channel, second selecting means under the control of the second digit for selecting a predetermined portion of the combined voltages as an output, third selecting means under the control of the third digit for selecting between the outputs of the second pair to obtain a quantity for combination with the output of the second selecting means, fourth selecting means under the control of the fourth digit for selecting a predetermined portion of the combined output as a slope voltage.

8. A pulse converter for decoding $n$ digit binary code groups and simultaneously producing two or more output voltages which comprise alternating current voltages of envelope levels determined by said code and falling along a selected number of straight line segments comprising, means for distributing the $n$ digits of a received code group for simultaneous occurrence, a source of alternating current of desired frequency, means for employing one portion of the code group to produce from said alternating voltage two magnitude voltages, each simultaneously appearing in an individual channel but with the sequence of magnitudes in the channels occurring in different orders to roughly approximate sinusoids of different relative phase, an evaluator for each channel for accepting the remaining code digits and the magnitude in that channel, each producing a predetermined portion of the magnitude with the portions decreasing negatively in response to half the code sequence, then increasing positively in response to the remaining part of the code sequences, connecting means for supplying the slope voltage from the evaluator in each channel and the magnitude occurring simultaneously in the input of the evaluator in the other channel to produce instantaneous values corresponding to the received code group in each of two output circuits corresponding respectively to said first and second channels.

9. A pulse converter for decoding $n$ digit binary code groups and simultaneously producing two or more output voltages which comprise alternating current voltages of envelope levels determined by said code and falling along a selected number of straight line segments comprising, means for distributing the $n$ digits of a received code group for simultaneous occurrence, a source of alternating current of desired frequency, means for employing one portion of the code group to produce from said source voltage two or more magnitude voltages, each voltage simultaneously appearing in an individual channel but with the sequence of magnitude in the channels occurring in different orders to roughly approximate sinusoids of different relative phase, evaluation means in each channel to accept the remaining code portion and the magnitudes in a channel, each evaluator producing as an ouput a predetermined portion of the magnitude with the portion decreasing negatively in response to half the code sequences, then increasing positively in response to the remaining code sequences, means for combining the magnitude in one channel with the evaluator output of a different channel where said evaluator output varies about the magnitude voltage thereby producing instantaneous values corresponding to the received code group in respective output circuits.

10. Apparatus as defined in claim 9 wherein the evaluator comprises means for receiving magnitudes in the channel to which it is connected and producing two pairs of output voltages of related amplitudes, said outputs in each pair being in phase opposition, first selecting means under the control of the first digit in order of decreasing significance of the remaining code portion for selecting between the outputs of the first pair to obtain a quantity for combination with the magnitude occurring simultaneously in the other channel, second selecting means under the control of the second digit for selecting a predetermined portion of the combined voltages as an output, third selecting means under the control of the third digit for selecting between the outputs of the second pair to obtain a quantity for combination with the output of the second selecting means, fourth selecting means under the control of the fourth digit for selecting a predetermined portion of the combined output as a slope voltage.

11. A pulse converter as defined in claim 9 wherein means connected to said two output circuits are arranged for deriving from the instantaneous values occurring therein three values suitable for operating a three phase synchro device.

12. In a remote indication system wherein information representing the successive angular positions of a rotating shaft is transmitted in binary code form, a receiver for simultaneously decoding the binary code and reproducing the encoded shaft position comprising, a source of alternating current, means for distributing a code group for simultaneous occurrence, means for employing one portion of the code group to produce from said source voltage two magnitude voltages, each voltage simultaneously appearing in a channel but with the sequence of magnitudes in the channels occurring in different orders to roughly approximate sinusoids of different relative phase, evaluation means in each channel to accept the remaining code portion and the magnitudes in a channel, each evaluator producing as an output a predetermined portion of the magnitude with the portion decreasing negatively in response to half the code sequences, then increasing positively in response to the remaining code sequences, means for combining the magnitude in one channel with evaluator output of the other channel thereby producing instantaneous values corresponding to the received code group in respective output circuits, a two phase synchro device connected across said output circuits and having a rotor excited from the source of voltage which rotates to the shaft position encoded at the transmitter.

No references cited.